July 3, 1962   F. C. JOHNSTON ET AL   3,042,889
BUSWAY SYSTEM
Filed May 26, 1958   2 Sheets-Sheet 2
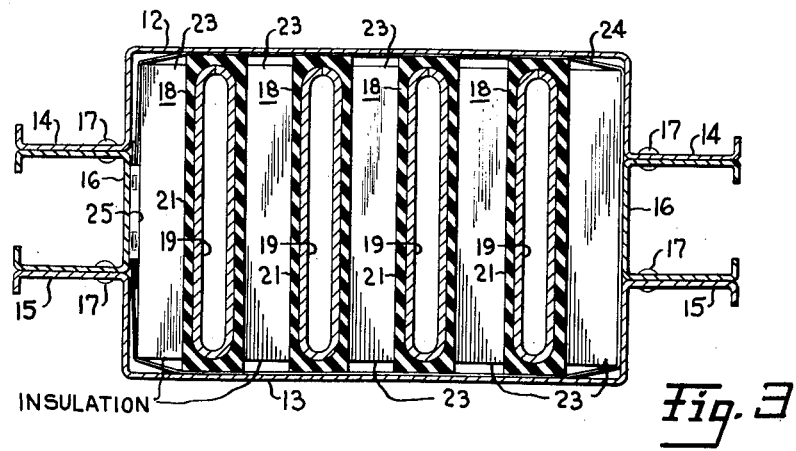
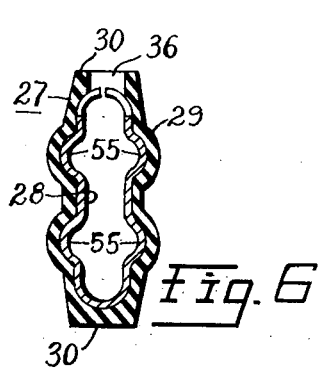
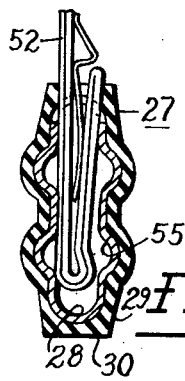
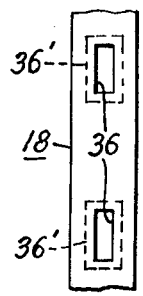
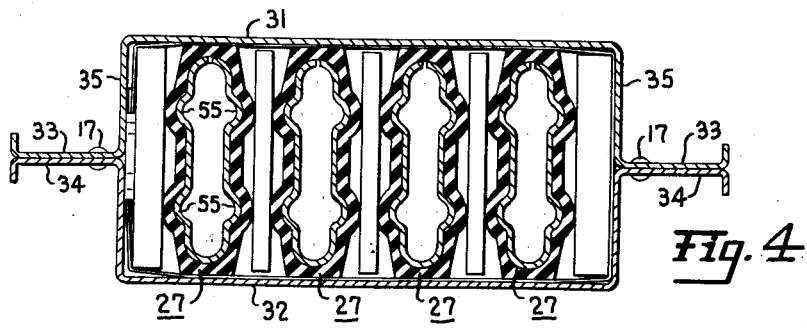
INVENTORS
FRANK C. JOHNSTON,
PAUL KRAUSS
BY Robert A. Casey
ATTORNEY

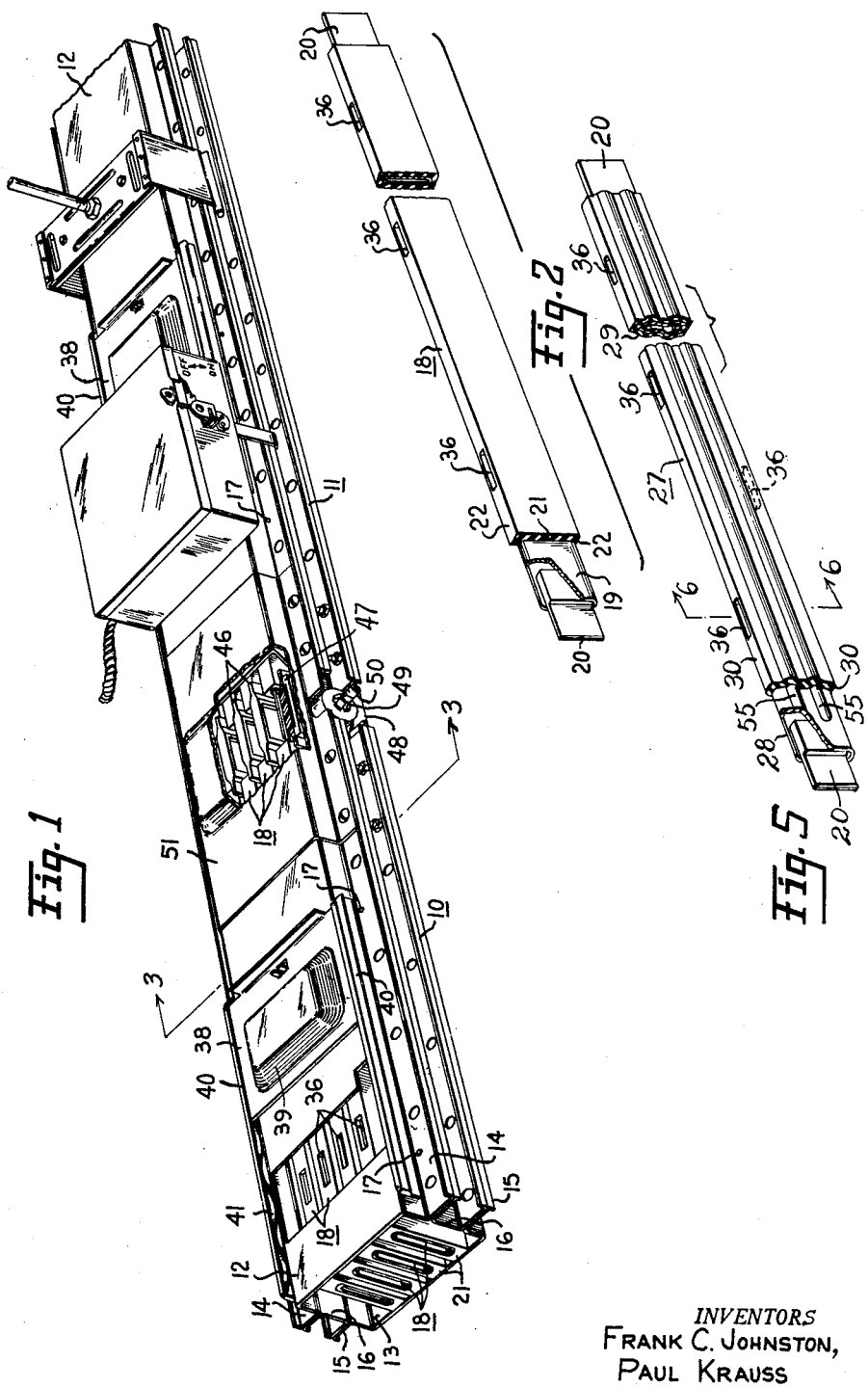

United States Patent Office 3,042,889
Patented July 3, 1962

3,042,889
BUSWAY SYSTEM
Frank C. Johnston, West Hartford, Conn., and Paul Krauss, Burlington, Vt., assignors to General Electric Company, a corporation of New York
Filed May 26, 1958, Ser. No. 737,954
4 Claims. (Cl. 339—22)

Our invention relates to electric power distribution apparatus of the type including a plurality of prefabricated sections each having an elongated housing and bus bars supported therein and known as "busway systems."

Prior application Serial No. 514,926, filed June 13, 1955, by Raymond N. Rowe, and assigned to the same assignee as the present invention, discloses an improved electric power busway system of greatly reduced size, weight, and expense, in which electric power bus bars are provided having spaced wall portions and also having a continuous mechanical engagement in insulated relation at either edge with corresponding wall portions of a metallic duct and longitudinally spaced apertures in the duct and in the insulation over the edge of the bars providing access for plug-in type power take-off devices or stabs which enter within the bus bar to contact the inner surfaces of the spaced wall portions. This construction makes possible a substantial reduction in the size of the busway duct over prior art busway systems, since the bus bars may be spaced relatively closely together, and a reduction in the cross-sectional area of conductors, since the conductors are supported all along their length by their engagement with the duct and since heat generated in such bus bars by electric current is conducted directly through a relatively thin coating of insulating material to the duct and there radiated directly to the outside air.

While this general construction provides substantial advantages in reduction of size and cost and improved performance of busway systems, we have found that certain aspects of the structure disclosed in the aforementioned Rowe application are capable of further improvement.

It is an object of the present invention to provide an electric power busway system of this general nature having conductors of the hollow or spaced wall type with improved arrangements for readily connecting them to conductors of other similar busway sections.

It is another object of the invention to provide a bus bar of novel and improved construction adapted for plug-in connection with a stab contact and adapted for end-to-end interconnection with another similar bus bar.

It is a further object of the invention to provide a bus bar as defined in the preceding object wherein the bus bar is provided with insulation having plug-in openings aligned with and smaller than plug-in openings formed in the bus bar to provide a dead front construction.

In carrying out the invention in one embodiment, an electric power busway system is provided including an elongated metallic housing of generally rectangular cross section, a plurality of electric power busway conductor assemblies supported in parallel relation within the housing, each conductor assembly comprising an elongated generally tubular conductor member having a homogeneous coating or sleeve of insulating material thereon and a plurality of longitudinally spaced openings at each edge of the conductor assembly permitting access to the interior of the electrical conductor bus bar assembly for contact with the inner wall surfaces thereof.

The conductor assemblies each comprise an elongated, generally tubular conductor and a pair of contact plug members fitted within the tubular member one at each end thereof and metallically bonded thereto, the conductor having longitudinally spaced plug-in openings in staggered relation at opposite edges thereof, substantially the entire portion of the intermediate portion of the bus bar being covered with a sleeve or coating of insulating material having apertures therein registering with the bus bar apertures. The apertures of the insulating material are smaller than the apertures of the bus bar so as to provide a dead front construction.

Other objects and advantages of the invention will in part become obvious and in part be pointed out in the following description. The specific aspects of the invention which are considered novel will be pointed out in the appended claims. The construction and operation of a particular embodiment, however, will be clearly understood by reference to the following detailed description taken in conjunction with the accompanying drawings, in which:

FIGURE 1 is a perspective view of a portion of a busway system incorporating the present invention, a portion thereof being broken away to disclose the joint connection structure;

FIGURE 2 is a perspective view of a bus bar assembly used in FIGURE 1;

FIGURE 3 is a sectional elevation view taken generally on the line 3—3 of FIGURE 1;

FIGURE 4 is a sectional elevation view similar to FIGURE 3 showing a modified conductor and housing configuration;

FIGURE 5 is a perspective view of bus bar assembly used in the busway system of FIGURE 4, portions thereof being broken away to better show the construction;

FIGURE 6 is a sectional elevation view of the bus bar assembly of FIGURE 5 taken on the line 6—6 of FIGURE 5;

FIGURE 7 is a view similar to FIGURE 6 but showing the contact of a plug-in type power take-off device in place; and FIG. 8 is a view in top plan with parts broken away of the bus bar assembly showing the relative sizes of the plug-in openings of the insulation and of the bus bar.

In the drawings, the invention is shown as incorporated in a busway system including two busway sections 10 and 11. Each of the busway sections 10 and 11 includes an elongated duct or housing having a generally rectangular cross section and including generally channel-shaped top and bottom housing cover members 12 and 13 respectively. The top and bottom housing covers 12 and 13 include outwardly directed flanges 14 and 15 respectively which are rigidly connected to corresponding sides of a channel-shaped spacer member 16 by suitable means, such as by rivets 17.

A plurality of bus bar assemblies 18 are provided within the busway housing. Each of the bus bar assemblies 18 comprises a generally tubular intermediate portion 19, solid contact plug portions 20 fitted within the end portions of the tubular intermediate portions, and a relatively thick covering of insulating material 21 having flattened top and bottom edges 22.

The conductor assemblies 18 are maintained in spaced apart relation with respect to each other and to the housing by means of insulating blocks 23, see FIGURE 3, the assembly of the insulating blocks and bus bar assemblies being tightly compressed together by means of a metal strap 24 having its ends overlapped and connected under tension at 25. While only one assembly of insulating blocks 23 and strap 24 is shown, this insulating and spacing support assembly is repeated at regular intervals longitudinally throughout each length 10 and 11, there being about one foot between successive insulating supports in a particular embodiment. The insulating and supporting assembly including blocks 23 and strap 24 is, in general, in accordance with the construction disclosed and claimed in application Serial No. 619,580 of L. E. Fisher et al., filed October 31, 1956, now Patent No. 2,948,771, and assigned to the same assignee as the present invention.

In FIGURE 4 there is shown a modified form of the invention including bus bar conductor assemblies 27 which are suited for use with electric currents of lower values, and therefore utilizing relatively thin wall sheet metal material. In this embodiment each conductor assembly, FIGURE 5, likewise comprises a generally tubular intermediate portion 28 and a relatively thick coating 29 of insulating material having top and bottom flattened portions 30, for contacting the housing cover portions 31 and 32. It will be observed that in this embodiment, the spacer member 16, utilized in the form of FIGURE 3, is omitted, and the relative height of the bus bar assemblies 27 is substantially reduced.

The top and bottom cover members 12 and 13 of FIGURE 3 and 31 and 32 of FIGURE 4 are generally channel-shaped with outwardly directed flanges 14, 15, and 33, 34, respectively.

Each of the electrical conductor assemblies 18 and 27 includes elongated longitudinally spaced apertures 36 extending through the insulation in alignment with apertures 36' of the bus bar conductor to permit the insertion of a power take-off contact device or stab, the apertures 36 being smaller than the apertures 36' to provide a dead-front construction. The busway housing covers 12, 13 and 31, 32 are each provided with longitudinally spaced enlarged apertures 37 to provide clearance for entrance of such contact stabs. The apertures 37 may be selectively closed by sliding covers 38. Each of the covers 38 comprises a generally channel-shaped cover member having a generally central bump or deformed portion 39 and having its outer edges slidably guided in channels provided by guide members 40 mounted on the side walls of the duct cover 12 and it is prevented from moving loosely in such channels by means of an undulating resilient elongated spring member 41.

Since the electrical conductor assemblies 18 are in intimate contact with the wall of the housing, the metallic sliding cover 38 which moves close to the cover of the busway housing and over the plug-in openings in the bus bar conductor would ordinarily move too close to the uninsulated portions of the bus bar conductors for safety. For this reason, the central or intermediate portion of the cover 38 is bumped or drawn outwardly from the direction of the housing to provide adequate air clearance between this portion and the uninsulated portion of the bus bar when the cover is in closed position. To provide adequate clearance with respect to the edge portion 42 of the cover 38, the edge portion 42 is coated with a coating of insulating material closely bonded and tightly adhered thereto, such, for instance, as an epoxy resin plastic material applied thereto in a molten condition.

The busway sections 10 and 11, when connected together, have the contact portions 20 of their respective corresponding bus bars extending in overlapping side-by-side engagement. To facilitate the formation of the overlapped joint between adjacent contact plugs in end-connected conductors, the exposed contact portion of each contact plug is preferably cut away on one side as seen in FIGURES 2 and 5 to a width of approximately one-half the thickness of the portion bonded within the tubular conductor. The contact portions 20 of one of the busway sections, such as section 11, also carry insulating spacer members 46, see FIGURE 1, which separate adjacent pairs of overlapped contact portions. Additional insulating spacer members 47, only one shown, are carried by a joint cover member 48. Also carried by the joint cover member 48 is a transverse clamping assembly comprising a relatively stationary nut 49 and a pressure bolt 50 threaded therein and carrying on the inner end thereof a pressure member, not shown, arranged to press against the insulator member 47 to urge it against the overlapped contact portions 20 and toward the opposite side of the inner wall of the busway section, thereby clamping all of the overlapped contact portions 20 together. A second housing joint cover 51 serves to completely enclose the joint. The construction and operation of the clamped joint portion per se of the busway system is more fully disclosed in our copending application Serial No. 737,934, now Patent No. 3,004,097 filed on the same day as the present application and assigned to the same assignee as the present invention.

Each conductor assembly 18 comprises an intermediate elongated generally tubular portion 19, as mentioned above, and end contact plug members 20, as well as a coating 21 of suitable insulating material. Each bus bar conductor assembly 18 is also provided with longitudinally spaced apertures 36 in the insulating coating 21 aligned with apertures 36' of the intermediate conductor portion 19 to provide access thereto of electric power take-off devices or stabs. In order to provide added strength to electrical conductors having a relatively thin wall, such as conductors 28, of FIGURE 5, a pair of spaced-apart rib portions 55 are provided in the intermediate portion of each side of such conductor and directed outwardly of the tubular conductor. This serves to make possible higher contact pressures on contact stabs 52, see FIGURE 7, inserted through openings 36.

The tubular conductors 19 and 28 each comprise a member bent up from flat strip material and having the edges of the flat strip abutting each other at one edge of the conductor 19.

The openings 36 in the insulating material 21 are of lesser size than the coresponding openings 36' in the bus bar conductor. This causes the butyl insulating material to project slightly beyond the edge of the conductor 19 around the openings 36', thereby presenting a "dead front assembly" even when the plug opening cover 38 is in the open position. Thus even with the cover in an open position, it is impossible for any one to contact a live conductor by merely brushing against the busway at the opening 37.

While we have shown only certain specific embodiments of our invention, it will be readily apparent that many modifications thereof may readily be made by those skilled in the art, and we therefore intend by the appended claims to cover all such modifications as fall within the true spirit and scope of the invention.

What we claim as new and desire to secure by Letters Patent of the United States is:

1. An electric bus bar conductor assembly comprising an elongated tubular conductive member having a cross-sectional height substantially greater than its cross-sectional width providing a pair of elongated closely spaced generally parallel wall portions connected together by edge portions, one of said edge portions having a plurality of longitudinally spaced elongated apertures for receiving a contact stab to contact the inner surfaces of said opposed wall portions, a coating of resilient insulating material surrounding said bus bar conductor in intimate thermal and mechanical contact therewith, said insulating material having a plurality of longitudinally spaced elongated apertures aligned with said conductor apertures and of slightly lesser size than said conductor apertures whereby an effective dead-front plug-in opening is provided, and a pair of solid contact plugs, one at each end of said conductor for overlapping side-by-side connection with similar contact plugs of other tubular conductive members, each of said plugs being integrally bonded to the interior of said tubular conductive member and extending to the outside thereof beyond the end of said insulating coating.

2. An electric bus bar conductor assembly comprising an elongated tubular conductive member having a cross-sectional height substantially greater than its cross-sectional width providing a pair of elongated closely spaced generally parallel wall portions connected together by edge portions, one of said edge portions having a plurality of longitudinally spaced apertures for receiving a contact stab to contact the inner surfaces of said opposed wall portions, a coating of resilient insulating material surrounding said bus bar conductor in intimate thermal and mechanical contact therewith, said insulating material having a plurality of longitudinally spaced apertures aligned with said conductor apertures to receive a contact stab, and a pair of solid contact plugs, one at each end of said conductor for overlapping side-by-side connection with similar contact plugs of other tubular conductive members, each of said plugs being integrally bonded to the interior of said tubular conductive member and extending to the outside thereof beyond the end of said insulating coating.

3. An electric power busway comprising an elongated busway housing, two sets of elongated conductive members in said housing with each set having a plurality of generally parallel conductive members spaced transversely of the direction of elongation of said housing, each of said members being of tubular configuration and having a pair of elongated closely spaced generally parallel wall portions connected by edge portions, one of said edge portions having a plurality of longitudinally spaced apertures for receiving a contact stab to contact the inner surfaces of the opposed wall portions, a coating of resilient insulating material surrounding each of said members in intimate thermal and mechanical contact therewith, said insulating material having a plurality of longitudinally spaced apertures aligned with the apertures of said edge members and with apertures formed in said housing, a separate solid contact plug for each member with each plug including a first portion extending within the associated tubular member and bonded to the interior thereof, and a second portion projecting outwardly from said member, the second portions of plugs associated with members of one set overlapping the adjacent second portions of plugs associated with members of the other set, and clamping means for clamping said overlapping plug second portions in tight engagement.

4. An electric power busway comprising an elongated busway housing, two sets of elongated conductive members in said housing with each set having a plurality of generally parallel conductive members spaced transversely of the direction of elongation of said housing, each of said members being of tubular configuration and having a pair of elongated closely spaced generally parallel wall portions connected by edge portions, one of said edge portions having a plurality of longitudinally spaced apertures for receiving a contact stab to contact the inner surfaces of the opposed wall portions, a coating of resilient insulating material surrounding each of said members in intimate thermal and mechanical contact therewith, said insulating material having a plurality of longitudinally spaced apertures aligned with the apertures of said edge members and with apertures formed in said housing, the apertures of said insulating material being smaller than the apertures of said edge portions, a separate solid contact plug for each member with each plug including a first portion extending within the associated tubular member and bonded to the interior thereof, and a second portion protecting outwardly from said member, the second portions of plugs associated with members of one set overlapping the adjacent second portions of plugs associated with members of the other set, and clamping means for clamping said overlapping plug second portions in tight engagement, said plug second portions having flat surfaces in overlapping engagement.

References Cited in the file of this patent

UNITED STATES PATENTS

| | | |
|---|---|---|
| 1,574,993 | Miner | Mar. 2, 1926 |
| 2,059,986 | Frank et al. | Nov. 3, 1936 |
| 2,250,513 | Von Gehr | July 29, 1941 |
| 2,264,075 | Frank | Nov. 25, 1941 |
| 2,267,610 | La Jone | Dec. 23, 1941 |
| 2,284,163 | O'Brien | May 26, 1942 |
| 2,356,006 | Samer | Aug. 15, 1944 |
| 2,372,155 | Fosch | Mar. 20, 1945 |
| 2,441,393 | Buchanan et al. | May 11, 1948 |
| 2,463,826 | Thacker | Mar. 8, 1949 |
| 2,468,614 | Carlson | Apr. 26, 1949 |
| 2,671,887 | Wellman | Mar. 9, 1954 |
| 2,747,257 | Ashcroft | May 29, 1956 |
| 2,848,792 | Reitz | Aug. 26, 1958 |
| 2,869,098 | Sauer | Jan. 13, 1959 |